United States Patent
Adams

(10) Patent No.: US 7,481,018 B1
(45) Date of Patent: Jan. 27, 2009

(54) BAIT BAITING APPARATUS

(76) Inventor: Michael D. Adams, 3305 N. 8th Ave., Sioux Falls, SD (US) 57104

( * ) Notice: Subject to any disclaimer, the term of this patent is extended or adjusted under 35 U.S.C. 154(b) by 0 days.

(21) Appl. No.: 11/615,168

(22) Filed: Dec. 22, 2006

(51) Int. Cl.
*A01K 83/06* (2006.01)
(52) U.S. Cl. ............... 43/44.2; 43/44.6; 43/44.8
(58) Field of Classification Search ........... 43/44.2, 43/44.4, 44.6, 44.8
See application file for complete search history.

(56) References Cited

U.S. PATENT DOCUMENTS

| | | | | |
|---|---|---|---|---|
| 605,538 | A * | 6/1898 | Dempsey | 43/44.2 |
| 765,482 | A * | 7/1904 | Hardy | 43/42.36 |
| 772,807 | A * | 10/1904 | Ketchum | 43/44.2 |
| 805,284 | A | 11/1905 | Greenway | |
| 849,036 | A | 4/1907 | Zimmerman | |
| 973,246 | A * | 10/1910 | Aagaard | 43/44.6 |
| 1,025,695 | A * | 5/1912 | Gibson | 43/44.4 |
| 1,796,877 | A * | 3/1931 | Schultz | 43/44.4 |
| 1,862,187 | A * | 6/1932 | Lageson | 43/44.6 |
| 1,961,378 | A | 6/1934 | Mitchell | |
| 1,993,582 | A * | 3/1935 | Anderson | 43/44.4 |
| 2,051,651 | A * | 8/1936 | Pachner et al. | 43/44.8 |
| 2,150,874 | A * | 3/1939 | Wagner | 43/44.4 |
| 2,237,389 | A | 4/1941 | Ludwig | |
| 2,257,403 | A * | 9/1941 | Vandine | 43/44.6 |
| 2,264,883 | A * | 12/1941 | Lent | 43/44.2 |
| 2,407,759 | A * | 9/1946 | McDougal | 43/44.4 |
| 2,508,559 | A * | 5/1950 | Worthington | 43/44.4 |
| 2,522,073 | A * | 9/1950 | Trada | 43/44.4 |
| 2,533,390 | A * | 12/1950 | Miller | 43/44.6 |
| 2,562,605 | A * | 7/1951 | Embree et al. | 43/44.4 |
| 2,653,048 | A * | 9/1953 | Novak | 43/4 |
| 2,700,242 | A * | 1/1955 | Porth | 43/44.4 |
| 2,719,379 | A * | 10/1955 | Fritts | 43/44.6 |
| 2,755,593 | A * | 7/1956 | Thurman | 43/44.2 |
| 2,765,574 | A * | 10/1956 | Martin | 43/44.4 |
| 2,775,058 | A * | 12/1956 | Roberts | 43/44.4 |
| 2,797,522 | A * | 7/1957 | Friedrich | 43/44.8 |
| 2,871,611 | A | 2/1959 | Shepard Jr. | |
| 2,894,351 | A * | 7/1959 | Doane | 43/44.6 |
| 2,895,254 | A * | 7/1959 | Krauss | 43/44.6 |
| 2,900,754 | A * | 8/1959 | Orlik | 43/44.2 |
| D187,187 | S * | 2/1960 | Mott | 43/44.6 |

(Continued)

FOREIGN PATENT DOCUMENTS

DE            3224492 A1 *  12/1983

(Continued)

*Primary Examiner*—Darren W Ark

(57) ABSTRACT

A live bait baiting apparatus includes a pair of arms. Each of the arms has a first end and a second end. The first ends terminate in a loop. A hook coupler is attached to the second ends of the arms. The second ends are spaced away from each other and the first ends extend away from the hook coupler. The hook coupler has a distal end with respect to the arms. The distal end has an opening therethrough for attaching a hook. Each gill of a pair of gills of a fish has one of the first ends extended therethrough and each of the first ends extends outwardly of a mouth of the fish to position the hook coupler below and behind the gills of the fish. A hook is attached to the distal end of the hook coupler and a fishing line is secured to each of the loops of the first ends.

4 Claims, 3 Drawing Sheets

U.S. PATENT DOCUMENTS

| | | | | |
|---|---|---|---|---|
| 2,927,393 | A * | 3/1960 | Flamisch et al. | 43/44.2 |
| 2,932,116 | A * | 4/1960 | Woodzick | 43/44.6 |
| 2,972,832 | A * | 2/1961 | Anselmi | 43/44.4 |
| 2,983,066 | A | 5/1961 | Poehlman | |
| 2,996,827 | A * | 8/1961 | Allen et al. | 43/44.2 |
| 3,047,976 | A * | 8/1962 | Gourlay | 43/44.4 |
| 3,137,960 | A * | 6/1964 | Sharp | 43/42.09 |
| 3,284,945 | A * | 11/1966 | Kurtis | 43/44.2 |
| 3,293,791 | A * | 12/1966 | Hinkson | 43/44.4 |
| 3,415,004 | A * | 12/1968 | Whalen | 43/44.4 |
| 3,435,553 | A | 4/1969 | Conley | |
| 3,492,752 | A * | 2/1970 | Viveiros | 43/44.8 |
| 3,494,066 | A | 2/1970 | Lawter | |
| 3,600,838 | A * | 8/1971 | Bablick | 43/44.8 |
| 3,738,049 | A * | 6/1973 | Garza | 43/44.4 |
| 3,778,921 | A | 12/1973 | Peterson | |
| 3,839,814 | A * | 10/1974 | Sykora | 43/44.2 |
| 3,914,896 | A | 10/1975 | Sahagian | |
| 3,992,801 | A * | 11/1976 | McDiarmid et al. | 43/44.8 |
| 4,349,979 | A | 9/1982 | Strantz | |
| 4,422,260 | A * | 12/1983 | Perrick | 43/44.8 |
| 4,646,464 | A * | 3/1987 | Wyatt | 43/44.4 |
| 4,848,023 | A * | 7/1989 | Ryder et al. | 43/44.2 |
| 4,910,907 | A * | 3/1990 | Schlaegel | 43/44.6 |
| 4,934,092 | A * | 6/1990 | Simmons et al. | 43/44.2 |
| 5,009,026 | A | 4/1991 | Corbitt, III. | |
| 5,027,544 | A * | 7/1991 | Schlaegel | 43/44.6 |
| 5,117,575 | A | 6/1992 | Desmond | |
| 5,333,407 | A | 8/1994 | Merritt | |
| 5,386,661 | A | 2/1995 | Davis | |
| 6,073,384 | A * | 6/2000 | Schlaegel | 43/44.2 |
| 6,219,956 | B1 * | 4/2001 | Hurt | 43/44.4 |
| 6,226,917 | B1 * | 5/2001 | Sylla et al. | 43/42.09 |
| 6,658,785 | B1 * | 12/2003 | Faulkner et al. | 43/44.2 |
| 2002/0152671 | A1 * | 10/2002 | Downey | 43/44.8 |

FOREIGN PATENT DOCUMENTS

| | | | |
|---|---|---|---|
| EP | 689764 | A1 * | 1/1996 |
| FR | 2607665 | A1 * | 6/1988 |
| FR | 2625408 | A1 * | 7/1989 |
| FR | 2796809 | A1 * | 2/2001 |
| FR | 2809283 | A1 * | 11/2001 |
| FR | 2840156 | A1 * | 12/2003 |
| FR | 2858178 | A1 * | 2/2005 |
| FR | 2865894 | A1 * | 8/2005 |
| JP | 08163939 | A * | 6/1996 |
| JP | 2001258444 | A * | 9/2001 |
| JP | 2003259781 | A * | 9/2003 |
| JP | 2003310101 | A * | 11/2003 |
| WO | WO 2005004595 | A1 * | 1/2005 |
| WO | WO 2007062449 | A1 * | 6/2007 |

* cited by examiner

BAIT BAITING APPARATUS

BACKGROUND OF THE INVENTION

1. Field of the Invention

The present invention relates to baiting devices and more particularly pertains to a new baiting device for attaching a fishing line and a fishing hook to a fish being used as live bait without damaging or injuring the fish.

2. Description of the Prior Art

The use of baiting devices is known in the prior art. While these devices fulfill their respective, particular objectives and requirements, the need remains for a device for attaching a hook to a fish used as bait that can be extended through both gills without hooking, and thereby injuring, the bait. By extending the device through both gills, instead of one, the bait will be balanced and will be able to swim in an unencumbered manner. The ability to swim freely allows the bait to more easily filter air through its gills to ensure it stays alive as well as ensure that the bait can swim in a normal manner. More lively bait will save time and money as the bait will not need to be frequently changed. Further, healthy and uninjured bait will provide more opportunities to catch fish. This will be due to the bait attracting more fish by its lively manner and because the hook will not need to be continuously removed from the water to replace the bait.

SUMMARY OF THE INVENTION

The present invention meets the needs presented above by generally comprising a pair of arms. Each of the arms has a first end and a second end. The first ends terminate in a loop. A hook coupler is attached to the second ends of the arms. The second ends are spaced away from each other and the first ends extend away from the hook coupler. The hook coupler has a distal end with respect to the arms. The distal end has an opening therethrough for attaching a hook. Each gill of a pair of gills of a fish has one of the first ends extended therethrough and each of the first ends extends outwardly of a mouth of the fish to position the hook coupler below and behind the gills of the fish. A hook is attached to the distal end of the hook coupler and a fishing line is secured to each of the loops of the first ends.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
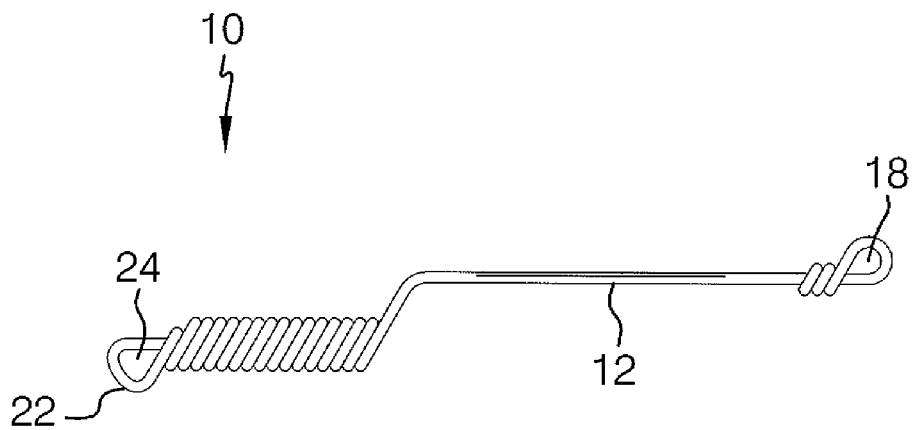
FIG. 1 is a side view of a first embodiment of a live bait baiting apparatus according to the present invention.
Figure 2:
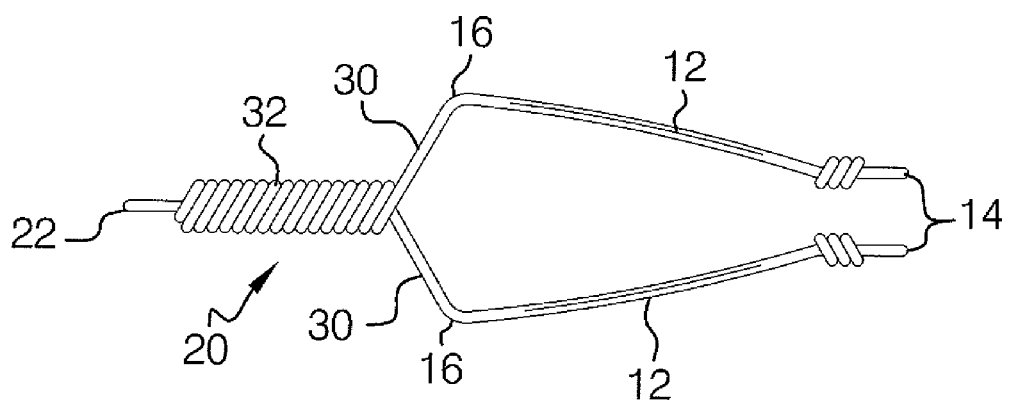
FIG. 2 is a top view of the first embodiment of the present invention.

With reference now to the drawings, and in particular to FIGS. 1 through 6 thereof, a new baiting device embodying the principles and concepts of the present invention and generally designated by the reference numeral 10 will be described.

As best illustrated in FIGS. 1 through 6, the live bait baiting apparatus 10 generally comprises a pair of arms 12. Each of the arms 12 has a first end 14 and a second end 16 and each of the first ends 14 terminates in a loop 18 which may be formed by wire or by an aperture extending through the arms 12 adjacent to the first ends 14.

A hook coupler 20 is attached to the second ends 16 of the arms 12. The second ends 16 are spaced away from each other and the first ends 14 extend away from the hook coupler 20. The arms 12 are angled toward each other from the second ends 16 to the first ends 14. The hook coupler 20 has a distal end 22 with respect to the arms 12. The distal end 22 has an opening 24 therethrough for attaching a hook 73 to the hook coupler 20.

The hook coupler 20 of the first embodiment shown in FIGS. 1-2 and 5-6 includes a pair of rods 30. Each of the second ends 16 is attached to one of the rods 30 and the rods 30 join together at an elongated medial member 32 positioned between the rods 30 and the distal end 22. The medial member 32 has a longitudinal axis lying in a first plane. Each of the arms 12 lies in a second plane that extends through each of the first 14 and second 16 ends of the arms 12. The first plane is orientated parallel to and spaced from the second plane. An angle formed by each of the rods 30 and a corresponding one of the arms 12 is approximately between 110 degrees and 170 degrees. The first embodiment of the apparatus 10 may be constructed from a single portion of wire.

Figure 3:
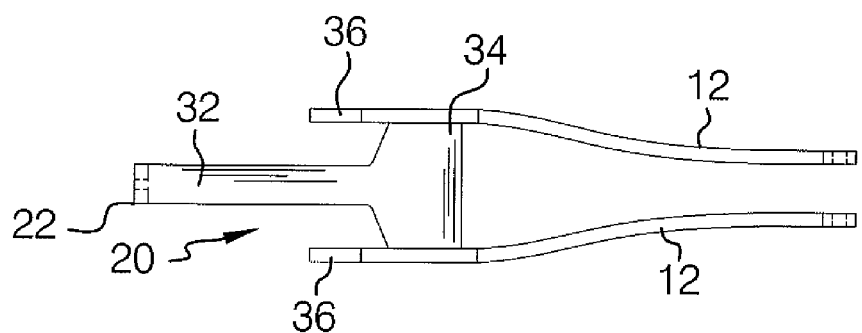
FIG. 3 is a top view of a second embodiment of the present invention.
Figure 4:
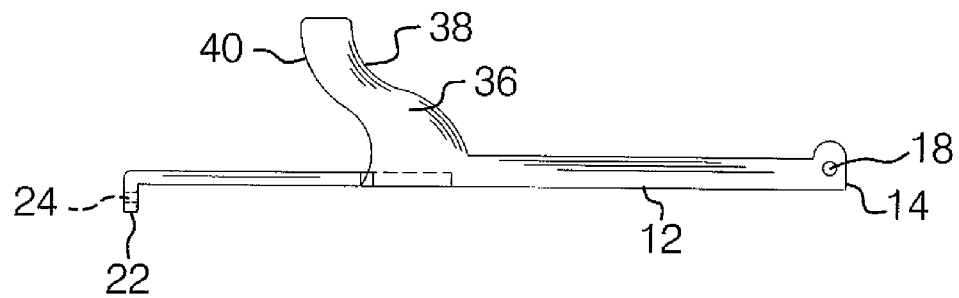
FIG. 4 is a side view of the second embodiment of the present invention.

The hook coupler of the second embodiment, shown in FIGS. 3 and 4, includes a plate 34 that is attached to and extends between each of the second ends. A medial member 32 is attached to the plate 34 and extends between the plate 34 and the distal end 22. The medial member 34 is approximately coplanar with the arms 12 and the plate 34. A pair of stabilizers 36 is provided. The stabilizers 36 are attached to and extend upwardly from one of a pair of junctures of the plate 34 and the arms 12 so that each of the arms 12 has one of the stabilizers 36 attached thereto. Each of the stabilizers 36 is substantially planar and has a forward edge 38 directed toward the first ends 14 of the arms 12 and a rearward edge 40 directed toward the medial member 32. The stabilizers 36 are each angled rearward toward the medial member 32, and the forward edges 38 are arcuate and may be S-shaped. The second embodiment of the apparatus 10 may be constructed from a single portion of sheet metal which is then cut and bent into the shape described above.

Figure 5:
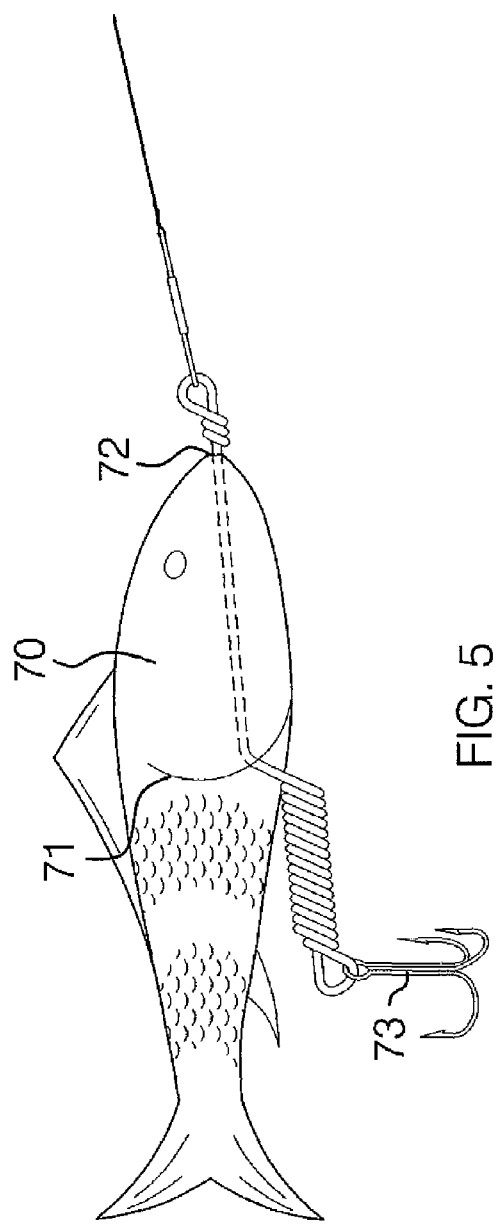
FIG. 5 is a side in-use view of the first embodiment of the present invention.
Figure 6:
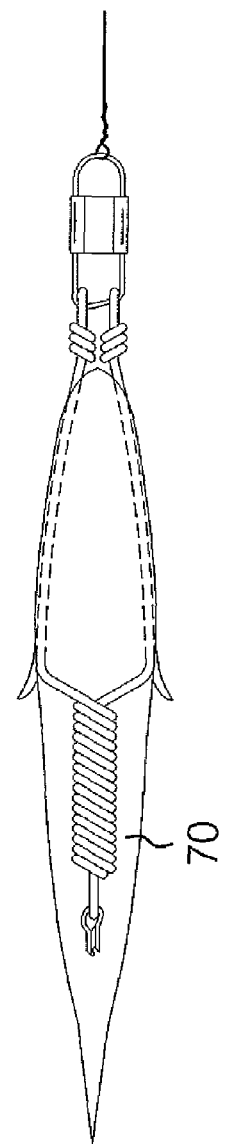
FIG. 6 is a bottom in-use view of the first embodiment of the present invention.

In use, each gill 71 of a pair of gills 71 of a fish 70 has one of the first ends 14 extended therethrough and each of the first ends 14 extends outwardly of a mouth 72 of the fish 70 to position the hook coupler 20 below and behind the gills 71 of the fish 70. This is shown in FIGS. 5 and 6 with the first embodiment but mimics that of the second embodiment. A hook 73 is attached to the distal end 22 of the hook coupler 20. A fishing line 74 is then secured to each of the loops 18 of the first ends 14. Additional bate may be attached to the hook 73 if desired. The apparatus 10 prevents injury to the fish 70 to ensure that it lives longer and swims in an unencumbered manner.

Fish 70, used as bait, have shown no ill affects after continuous 12 hour periods with the apparatus 10 being used. The spaced planes of the first embodiment ensure that the medial portion 32 hugs the fish 70 along its underside and prevents pinching and damaging of the fish 70 by the connection between the rods 30 and the medial portion 32. The stabilizers 36 of the second embodiment also prevent the plate 34 from being pulled to tightly against the fish 70 and the shape of the forward edges 38 prevents damages to the gills 71. Each of the first and second embodiments may come in a variety of sizes dependent upon the size of the bait being used.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A baiting apparatus for attaching a hook to live bait without harming the bait, the bait being a fish, said apparatus comprising:
   a pair of arms, each of said arms having a first end and a second end, said first ends being spaced from each other, each of said first ends comprising terminating in a loop;
   a single hook coupler, each of said second ends of arms being attached to said hook coupler, said second ends being spaced away from each other and said first ends extending away from said hook coupler, said hook coupler having a distal end with respect to said arms, said distal end having an opening therethrough for attaching a hook, said first ends each extending away from said hook coupler and defining free ends;
   said hook coupler including a pair of rods, each of said second ends being attached to one of said rods, said rods joining together at an elongated medial member positioned between said rods and said distal end, said medial member having a longitudinal axis lying in a first plane, each of said arms lying in a second plane that extends through each of said first and second ends of said arms, said first plane being orientated parallel to and spaced from said second plane, wherein said medial member lies below the second plane when said arms are extended through the fish;
   wherein each of said first ends is extendable into each of a pair of gills of the fish and extendable outwardly of a mouth of the fish to position the hook coupler below and behind the gills of the fish;
   wherein a hook is attached to said distal end of said hook coupler; and
   wherein a fishing line is secured to each of said loops of said first ends.

2. The apparatus according to claim 1, wherein said arms are angled toward each other from said second ends to said first ends.

3. The apparatus according to claim 1, wherein an angle formed by each of said rods and a corresponding one of said arms being approximately between 110 degrees and 170 degrees.

4. A baiting apparatus for attaching a hook to live bait without harming the bait, the bait being a fish, said apparatus comprising:
   a pair of arms, each of said arms having a first end and a second end, each of said first ends terminating in a loop;
   a hook coupler being attached to said second ends of said arms, said second ends being spaced away from each other and said first ends extending away from said hook coupler, said arms being angled toward each other from said second ends to said first ends, said hook coupler having a distal end with respect to said arms, said distal end having an opening therethrough for attaching a hook, said hook coupler including;
   a pair of rods, each of said second ends being attached to one of said rods, said rods joining together at an elongated medial member positioned between said rods and said distal end, said medial member having a longitudinal axis lying in a first plane, each of said arms lying in a second plane that extends through each of said first and second ends of said arms, said first plane being orientated parallel to and spaced from said second plane, an angle formed by each of said rods and a corresponding one of said arms being approximately between 110 degrees and 170 degrees;
   wherein each of said first ends is extendable into each of a pair of gills of the fish and extendable outwardly of a mouth of the fish to position the hook coupler below and behind the gills of the fish;
   wherein a hook is attached to said distal end of said hook coupler; and
   wherein a fishing line is secured to each of said loops of said first ends.

* * * * *